US008051382B1

(12) United States Patent  (10) Patent No.: US 8,051,382 B1
Kingdom et al.  (45) Date of Patent: Nov. 1, 2011

(54) DISPLAYING RATING INDICATIONS FOR DROP TARGETS IN RESPONSE TO USER DRAGGING OF MOBILE ICON

(75) Inventors: Michael Kingdom, Fort Collins, CO (US); Edgar Circenis, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 505 days.

(21) Appl. No.: 12/261,542

(22) Filed: Oct. 30, 2008

(51) Int. Cl.
    *G06F 3/048* (2006.01)
(52) U.S. Cl. .................. 715/769; 715/736; 715/737
(58) Field of Classification Search .................. 715/769, 715/734; 709/224
    See application file for complete search history.

(56) References Cited

U.S. PATENT DOCUMENTS

| 6,411,314 | B1 * | 6/2002 | Hansen et al. | 715/769 |
| 6,559,867 | B1 * | 5/2003 | Kotick et al. | 715/771 |
| 7,552,438 | B1 * | 6/2009 | Werme et al. | 718/104 |
| 7,640,511 | B1 * | 12/2009 | Keel et al. | 715/769 |
| 2003/0036873 | A1 * | 2/2003 | Sierer et al. | 702/123 |
| 2003/0036876 | A1 * | 2/2003 | Fuller et al. | 702/127 |
| 2004/0003077 | A1 * | 1/2004 | Bantz et al. | 709/224 |
| 2006/0031511 | A1 * | 2/2006 | Salt | 709/227 |
| 2007/0192720 | A1 * | 8/2007 | Alsup et al. | 715/769 |
| 2008/0077366 | A1 * | 3/2008 | Neuse et al. | 703/2 |

* cited by examiner

*Primary Examiner* — Boris Pesin
*Assistant Examiner* — Daeho D Song

(57) ABSTRACT

When a user drags a mobile icon, ratings indications are displayed for target icons on which said mobile icon can be dropped.

15 Claims, 3 Drawing Sheets

DISPLAYING RATING INDICATIONS FOR DROP TARGETS IN RESPONSE TO USER DRAGGING OF MOBILE ICON

BACKGROUND OF THE INVENTION

Some centrally managed computer systems permit a user-administrator to assign computing workloads, e.g., an application and operating system, to hosts, e.g., servers. For example, the managed system can be represented on a workstation display. A mobile icon, representing a workload can be moved from a source icon representing a source host on which the workload is currently running to a target icon representing a host that is to serve as a migration target for the workload. The user can cut-and-paste or drag-and-drop onto a target icon to migrate the workload to the host represented by the target icon.

Hosts can differ in their suitability for hosting a particular workload. One host may not meet the minimum hardware requirements for a workload, another host may meet those requirements but for the fact that it is running other workloads, another host may meet the minimum requirements not but the recommended specifications, another may meet the recommended specifications, etc. Some central management products gather the necessary information to determine the suitability of the various hosts for running a workload. A user can select a workload icon and then select a menu item for migration targets. In response, a separate page appears with a tabular view of the potential target hosts, listing their suitability as drop targets.

BRIEF DESCRIPTION OF THE DRAWINGS

The figures depict implementations/embodiments of the invention and not the invention itself.

DETAILED DESCRIPTION

The present invention provides a user interface that displays drop-target ratings indications in response to a user dragging a mobile icon. In the context of workload management, the mobile object can represent a workload and source and target icons can represent source and target hosts. Having the rating indications appear in response to a drag operation is far more convenient and intuitive than requiring a menu selection.

Figure 1:
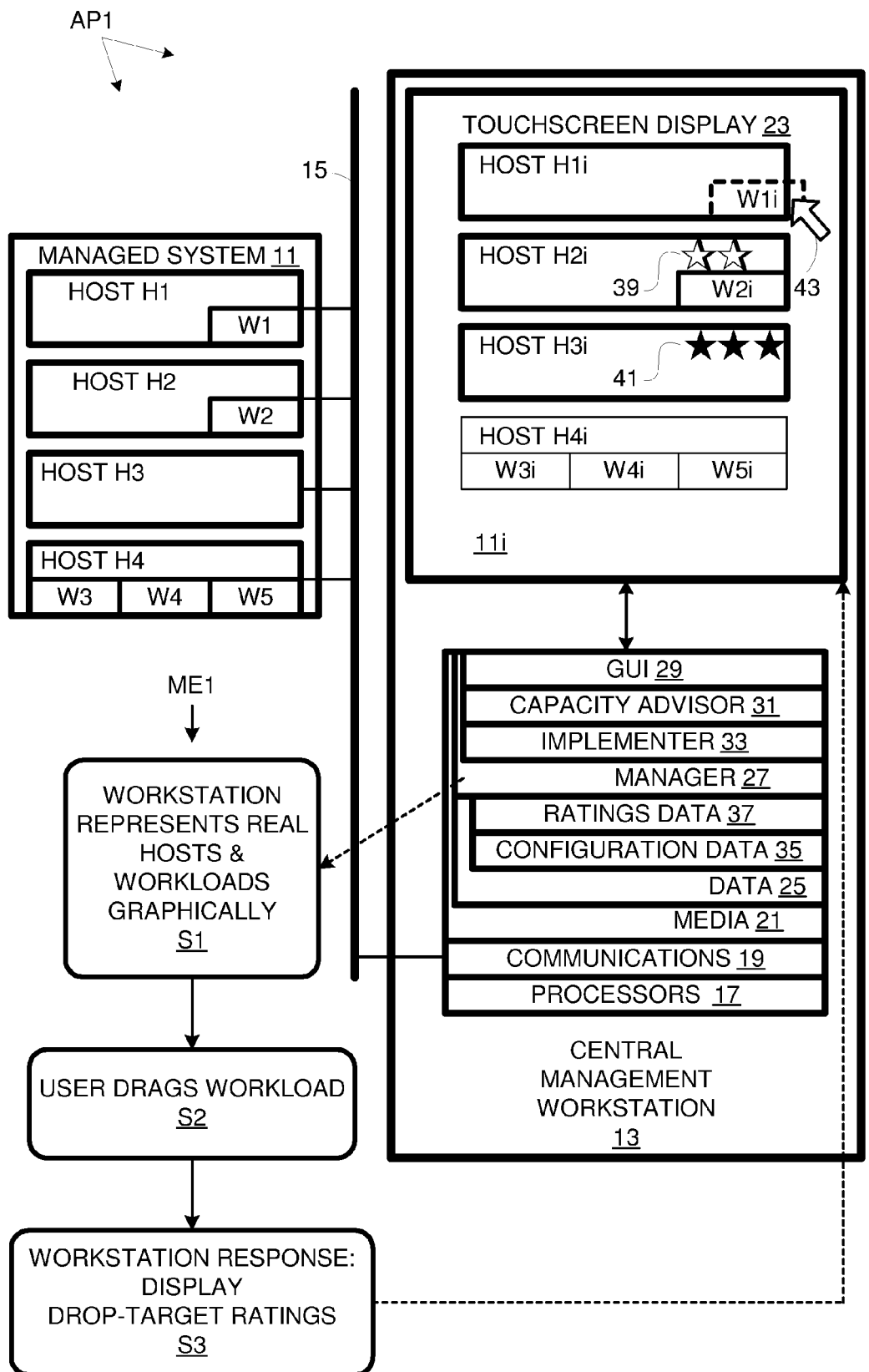
FIG. 1 is a combination schematic diagram of a centrally managed computer system and a flow chart of a method employed on a management workstation of that system.

In accordance with an embodiment of the invention shown in FIG. 1, a computer system AP1 includes a managed system 11, a central management workstation 13, and a network 15 over which workstation 13 communicates with managed system 11. Managed system 11 includes computing workloads W1-W5 and hosts H1-H4 for running those workloads. A workload typically includes an application program and an operating system on which it runs. A host is typically a server; in the illustrated embodiment, hosts H1-H4 are hardware servers. In other embodiments, both hardware servers and virtual servers are provided. A virtual server can be both a host for an operating system and a workload for the hardware on which it runs.

Workstation 13 includes processors 17, communications devices 19, media 21, including main memory and disk-based storage, and a touchscreen display 23. Encoded on media 21 are data 25 and a manager 27 of computer-executable instructions for manipulating data 25. Manager 27 provides a graphical user interface (GUI) 29, a capacity advisor 31, and an implementer 33. Data 23 includes configuration data 35 and ratings data 37. Herein, all actions provided by GUI 29, capacity 31, and implementer 37 are also attributed to manager 27 and workstation 13.

Manager 25 communicates via communication devices 19 and network 15 with managed system 11 to determine what hosts and workloads are included, and to determine which workloads run on each host. The resulting configuration data 35 is represented on display 23. Managed system 11 is represented by a complex graphical object 11*i*, hosts H1-H4 are respectively represented by host icons H1*i*-H4*i*, and workloads W1-W5 are represented by mobile icons W1*i*-W5*i*. The characterization of icons as "mobile", "source" or "target" is determined by their roles in a method ME1 employed by workstation 13 and manager 25.

Highlights of method ME1 are shown in FIG. 1. At method segment S1, manager 25 presents icons or other graphical objects on display 23 so as to represent managed system 11 including its hosts H1-H4 and workloads W1-W5. At method segment S2, a user drags a mobile icon W1*i*, representing workload W1, away from a source icon H1*i*, representing host H1. At step S3, in response to the dragging, manager 25 displays indications of drop-target ratings for suitable hosts. These indications include a pair of white stars 39 for target icon H2*i* representing host H2, and a trio of black stars 41 for target icon H3*i*.

Capacity advisor 31 determines ratings data 37, represented by star indications 39 and 41, from configuration data 35, which manager 25 gathers from managed system 11. The illustrated ratings data indicates that host H4 is not a suitable host for workload WL1. Accordingly, icon H4*i*, representing host H4, is de-emphasized (e.g., dimmed) in FIG. 1. Ratings data 37 also indicates that host H1 is a suitable target for W1*i*, but this is obvious since workload W1 has been running on host H1.

A target icon with a star indication is a suitable drop target for a drag and drop operation. A single star indicates that minimum requirements are met. A pair of stars indicates that recommended requirements are met. A trio of stars indicates that maximal requirements are met. In this case, maximal requirements are those for which further increases in specifications will result in at most negligible advantages. Black stars indicate that migration to the target will require some manual reconfiguration, while white stars indicate that migration can be effected without manual reconfiguration.

GUI 29 provides a cursor (pointer) 43, the position of which can be controlled by a user, e.g., through touch gestures on touchscreen display 23, although other input devices, such as a mouse or a trackball, can be used to control cursor 43. Cursor 43 is placed over objects for dragging, hovering, and dropping. Dragging causes ratings to be displayed. Hovering causes hover text that provides for details to the ratings. Dropping causes the indicated migration to occur.

Figure 2:
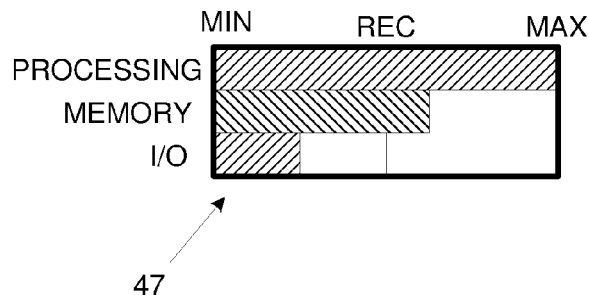
FIG. 2 is a diagram of a multi-dimensional rating indication.

In alternative embodiments, hovering can elaborate on a rating by eliciting a more detailed graphical ratings indication 47, shown in FIG. 2. Ratings indication 47 shows resource levels for processing, memory, and input-output devices (e.g., available bandwidth for communicating with a storage array network). The ratings are continuous and relative to minimum, recommended, and maximal specification. This more detailed information may help a user choose between potential targets.

Figure 3:
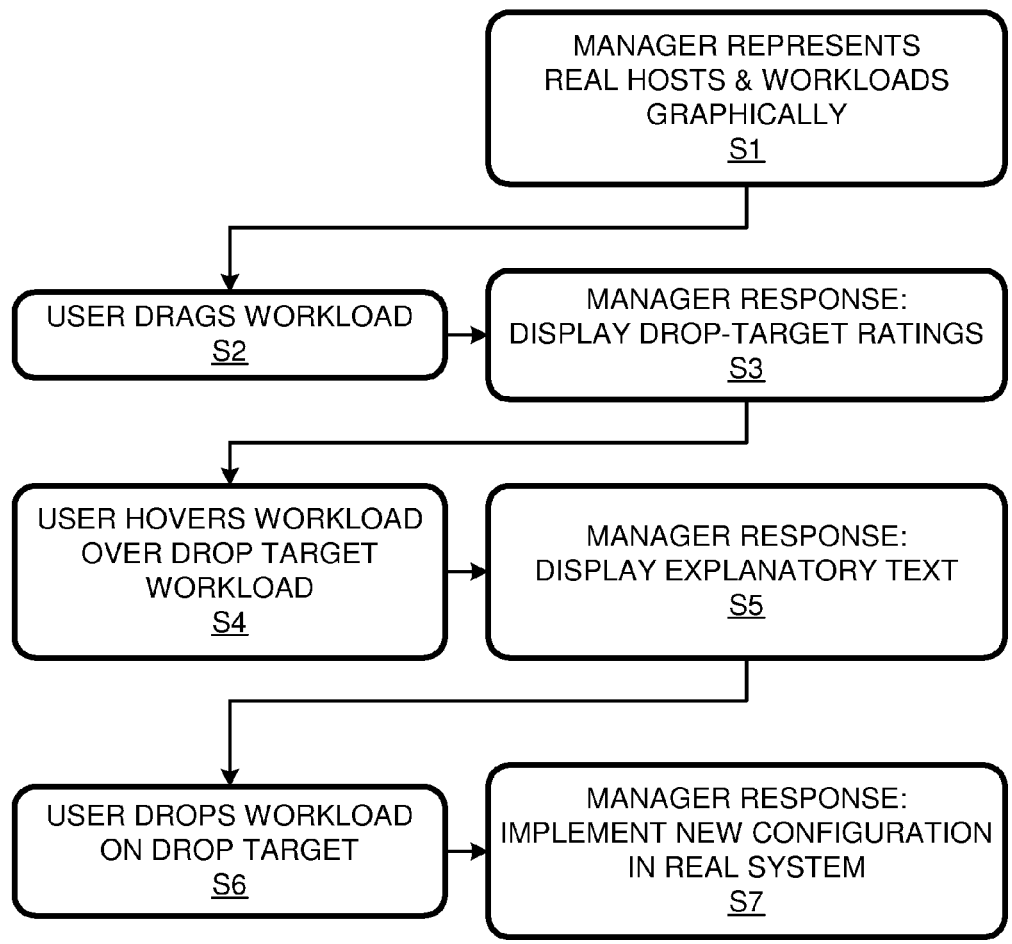
FIG. 3 is an extended flow chart of the method of FIG. 1.

Method ME1 is explained in greater detail with reference to FIG. 3. At step S1, manager 25 represents real computing workloads and hosts graphically. To this end, GUI presents workload icons W1*i*-W5*i* and source and target icons H1*i*-H5*i* on display 23. Manager 27 collects the underlying configuration over network 15 from managed system 11. The initial display is represented at time T1 in the state diagram of FIG. 4.

At step S2, a user drags workload icon W1*i*, e.g., by moving a finger along touchscreen display 23. At step S3, in response to the user dragging icon W1*i*, GUI 29 displays suitability rating indications 39 and 41 for suitable drop targets H2*i* and H3*i*, as indicated at time T2 in FIG. 4 and in FIG. 1. In an alternative embodiment, ratings indications are also provided for former source host icon H1*i*. Icon H4*i* is de-emphasized, e.g., dimmed, to indicate that it is not a suitable drop target for icon W1*i* and therefore is not rated.

At step S4, the user drags and hovers icon W1*i* over suitable target H2*i*. This can be done by dragging object W1*i* to a position over a target icon, in this case, H2*i*. This step corresponds the transition between times T2 and time T3 in FIG. 4.

Figure 4:
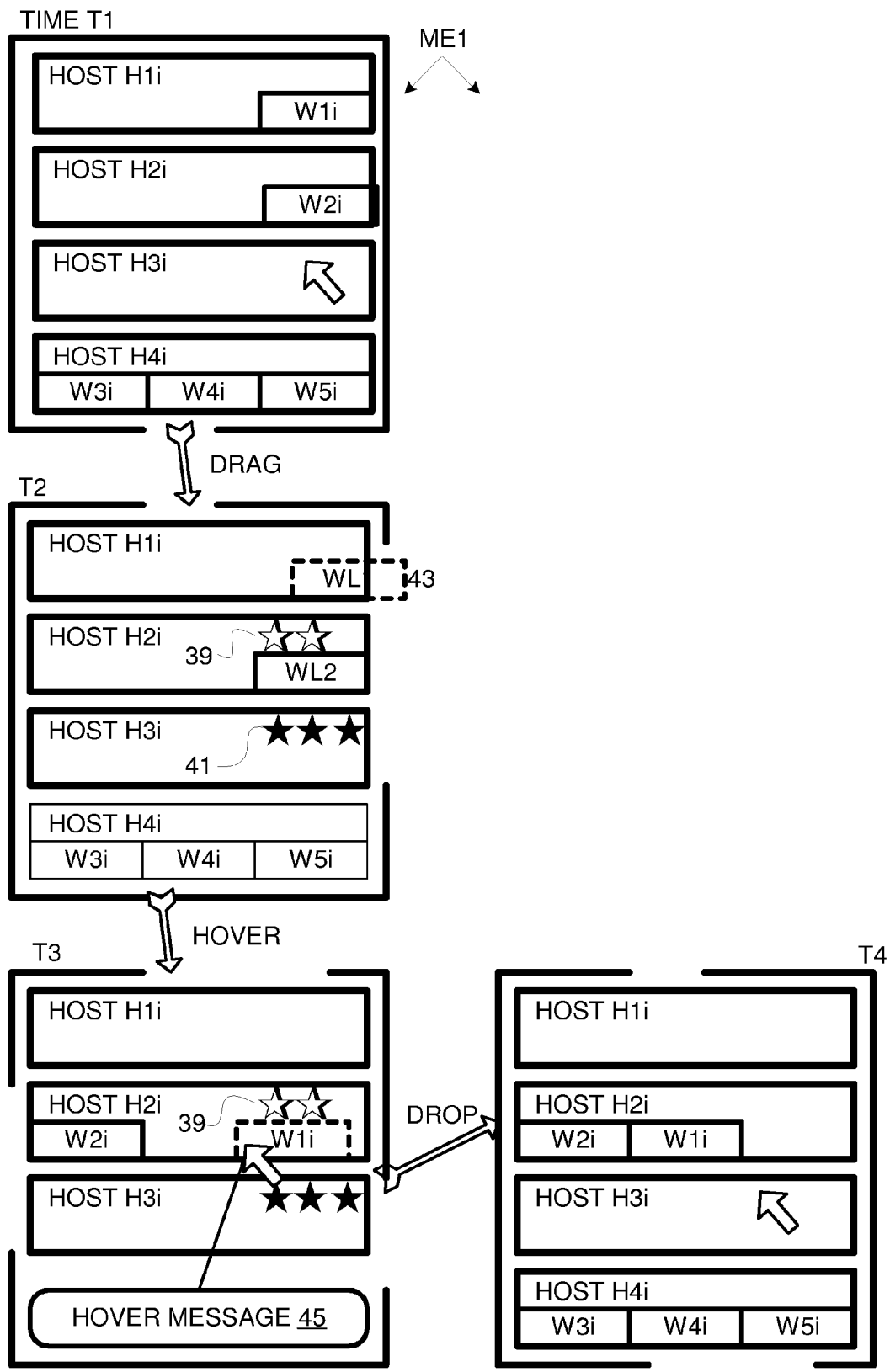
FIG. 4 is a state diagram for the method of FIG. 2.

At step S5, in response to the hovering, GUI 29 displays a hover message 45, as shown at time T3 in FIG. 4. Hover message 45 includes text explaining the rating for target icon over which the draggable object is hovering, thus elaborating on the rating. For example, the hover message can present summary data regarding its resource levels for processors, communications devices, and media. In addition, hover message 45 can explain why stars 39 are white instead of black. For example, message 45 can explain that configuration of host H2*i* will be automatic. Hovering over host H3*i*, which has black stars, would yield hover text indicating that manual configuration would be required if workload W1 is migrated to host H3.

At step S6, a user drops icon W1*i* on target on H2*i*. For example, the user can hover icon W1*i* over target H2*i* and remove the finger from touchscreen display 23. This step is represented at time T3 in FIG. 4.

At step S7, in response to the drop, GUI 29 snaps icon W1*i* to a position next to icon W2*i* within host icon H2*i*. Implementer 33 implements the indicated new configuration. Also, in response to the drop, GUI 29 removes ratings indications 39 and 41, since there is no pending drag operation. The result is shown in FIG. 4 for time T4.

Herein, a "drop-target rating" is a value selected from a set of drop-target rating values representing at least two different degrees of suitability of an icon or other graphical object as a drop target. A drop-target rating may but need not provide a value for an object that is not suitable as a drop target. If the ratings includes a value for an object that is not suitable as a drop target, the drop-target rating values must include at least two other values to differentiate the suitabilities, e.g., relatively high suitability versus relatively low suitability, of objects that are suitable drop targets.

Drop target ratings can be one-dimensional or multidimensional. For example, the ratings can include separate ratings for processing resources, memory resources, and communications resources. If the ratings are multidimensional, the indications of those ratings can be one-dimensional or multidimensional. For example, minimum and recommended levels can be set for each dimension. In a one-dimensional indication scheme, a low-rating indication can be given if all minima are met and a high-rating indication can be given if all recommended requirements are met. In a multidimensional scheme, whether minimum or recommended requirements are met can be represented separately for processing power, memory resources, and communications resources.

The present invention provides for a variety of alternative embodiments. The parameters being rated and the icons and graphical objects used to represent those parameters can be varied. The number of dimensions can range from one to many. Different graphical parameters such as size, shape, color, orientation, etc. can be varied to indicate values for multiple parameters. The user interface can be used to represent real objects other than hosts and workloads. These and other variations upon and modifications to the illustrated embodiment are provided by the present invention, the scope of which is defined by the following claims.

What is claimed is:

1. A method comprising:
a workstation presenting on a display icons including a mobile icon and plural target icons for said mobile icon;
a user dragging said mobile icon to one of said target icons;
said workstation responding to said dragging by displaying rating indications of drop-target ratings for each of said target icons;
said workstation is connected to a managed system including a workload and hosts for said workload, said mobile icon representing said workload, said target icons representing respective hosts, and said ratings respectively representing degrees to which said hosts meet requirements of said workload; and
a target icon with rating indications is a suitable drop target for a drag and drop operation, wherein a first rating indication indicates that minimum requirements are met, wherein a second rating indication indicates that recommended requirements are met, wherein a third rating indication indicates that maximal requirements are met, wherein a fourth rating indication indicates that migration to the target will require a manual reconfiguration, and wherein a fifth rating indication indicates that migration can be effected without manual reconfiguration.

2. A method as recited in claim 1 further comprising:
said user dropping said mobile icon on one of said target icons representing a first of said hosts; and said workstation, in response to said dropping, migrating said workload to said first host.

3. A method as recited in claim 1 further comprising said user causing said mobile icon to hover over one of said target icons for which a rating is displayed, said workstation, in response to said hovering, displaying data elaborating on said rating.

4. A method as recited in claim 1 wherein said ratings indications are multidimensional.

5. A system comprising:
a workstation having a processor for managing a managed system including a workload and plural hosts meeting requirements for running said workload, said workstation providing a graphical user interface for representing said managed system, said interface presenting a mobile icon representing said workload, said interface presenting target icons representing said hosts, said interface providing for a user dragging and dropping said mobile icon on said target icons, said interface responding to said dragging by displaying ratings indications of drop-target ratings for said drop targets icons, wherein said ratings respectively representing degrees to which said hosts meet requirements of said workload; and
a target icon with rating indications is a suitable drop target for a drag and drop operation, wherein a first rating indication indicates that minimum requirements are met, wherein a second rating indication indicates that recommended requirements are met, wherein a third rating indication indicates that maximal requirements are met, wherein a fourth rating indication indicates that migration to the target will require a manual reconfiguration, and wherein a fifth rating indication indicates that migration can be effected without manual reconfiguration.

6. A system as recited in claim 5 further comprising said managed system, said workstation being in communication with said managed system so that said workstation makes evaluations of said workload and said hosts, said workstation determining said ratings as a function of said evaluations.

7. A system as recited in claim 6 wherein said workstation includes an implementer coupled to said interface and said managed system so that, once said user drops said mobile icon on a target icon, said implementer migrates said workload to the host represented by said target icon.

8. A system as recited in claim 5 wherein said interface provides for a user to hover said mobile icon over one of said target icons, said interface, in the event said user hovers said mobile icon over said object, displaying a text message explaining an indication of a rating for said target icon.

9. A system as recited in claim 5 wherein said rating indications are multidimensional.

10. A manufacture comprising:
computer-readable non-transitory storage media encoded with a manager of computer-executable instructions including a workload and plural hosts meeting requirements for running said workload, said manager, when executed, providing a graphic user interface through which a user can interact with mobile icons and target icons on a display, said interface providing for a user to drag a mobile icon and to drop said mobile icon on a target icon, said interface responding to said user dragging by displaying rating indications of drop-target ratings for said target icons, wherein said ratings respectively representing degrees to which said hosts meet requirements of said workload; and
a target icon with rating indications is a suitable drop target for a drag and drop operation, wherein a first rating indication indicates that minimum requirements are met, wherein a second rating indication indicates that recommended requirements are met, wherein a third rating indication indicates that maximal requirements are met, wherein a fourth rating indication indicates that migration to the target will require a manual reconfiguration, and wherein a fifth rating indication indicates that migration can be effected without manual reconfiguration.

11. A manufacture as recited in claim 10 wherein said manager, when executed, communicates with a managed system including a computer workload and hosts capable of running said computer workload, said mobile icon representing said computer workload, said target icons representing said hosts.

12. A manufacture as recited in claim 11 wherein said manager includes a capacity advisor that, when executed, rates said hosts according to different degrees to which they meet computing requirements of said workload, said ratings representing said degrees to which the hosts corresponding to said target icons meet said requirements.

13. A manufacture as recited in claim 12 wherein said manager includes an implementer that can be triggered when said user drops said mobile icon on a first of said target icons, said implementer, when triggered by said user migrating said workload to the host represented by said first target icon.

14. A manufacture as recited in claim 10 wherein said interface provides for a user hovering said mobile icon over a target icon, said interface responding to said hovering by displaying a message elaborating on a rating indication for said target icon.

15. A manufacture as recited in claim 10 wherein said rating indications are multidimensional.

* * * * *